United States Patent
Bavishi (10) Patent No.: US 11,636,047 B2
(45) Date of Patent: Apr. 25, 2023

(54) HASH OPERATIONS IN MEMORY FOR DATA SHARING

(71) Applicant: Micron Technology, Inc., Boise, ID (US)

(72) Inventor: Dhawal Bavishi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 60 days.

(21) Appl. No.: 17/462,828

(22) Filed: Aug. 31, 2021

(65) Prior Publication Data

US 2023/0068102 A1    Mar. 2, 2023

(51) Int. Cl.
| | |
|---|---|
| *G06F 12/00* | (2006.01) |
| *G06F 12/14* | (2006.01) |
| *G06F 9/455* | (2018.01) |
| *G06F 21/64* | (2013.01) |

(52) U.S. Cl.
CPC ...... *G06F 12/1408* (2013.01); *G06F 9/45558* (2013.01); *G06F 12/1425* (2013.01); *G06F 21/64* (2013.01); *G06F 2009/45583* (2013.01); *G06F 2009/45587* (2013.01)

(58) Field of Classification Search
CPC ............. G06F 12/1408; G06F 9/45558; G06F 12/1425; G06F 21/64; G06F 2009/45583; G06F 2009/45587
See application file for complete search history.

(56) References Cited

U.S. PATENT DOCUMENTS

| | | |
|---|---|---|
| 6,484,250 B1 | 11/2002 | Mei et al. |
| 9,760,492 B2 | 9/2017 | Huang et al. |
| 2019/0042144 A1* | 2/2019 | Peterson ............... G06F 3/0635 |
| 2020/0136996 A1* | 4/2020 | Li ......................... H04L 47/125 |

FOREIGN PATENT DOCUMENTS

WO    2008119269 A1    10/2008

* cited by examiner

*Primary Examiner* — Arvind Talukdar
(74) *Attorney, Agent, or Firm* — Brooks, Cameron & Huebsch, PLLC (57) ABSTRACT

A method includes receiving a command, from a host, to an address of a memory device, the command comprising a different address. The method also includes determining based on the address whether to perform a hash operation and, responsive to determining to perform the hash operation, accessing data stored in memory cells having the different address. The method further includes performing the hash operation using the data to generate a signature for the data and providing the host access to the signature to determine whether the data is duplicate data.

25 Claims, 7 Drawing Sheets

HASH OPERATIONS IN MEMORY FOR DATA SHARING

TECHNICAL FIELD

Embodiments of the disclosure relate generally to memory sub-systems, and more specifically, relate to performing hash operations in memory for data sharing.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to sharing data stored in a memory sub-, in particular to memory sub-systems that perform hash operations for data sharing. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Computing systems running a hypervisor with several virtual machines (VMs) are often memory resource constrained. Each VM has memory pages specific to that VM. Various of the memory pages can be common. Common pages can include pages that comprise data that is the same. The common pages can be data that is the same between the common pages such as program code or data in-memory. Read-only access can be provided to the common pages.

A hypervisor can attempt to find common pages with common data using hashing techniques. The hashing techniques can summarize the contents of contiguous data (e.g., a memory page comprising 4 kB) by passing it through a hashing algorithm and getting a small sized output result as a signature (e.g., 64-bit or larger). When the same hashing algorithm is used on each page, each page can have a unique signature (e.g., hash) associated with it. Thus, the translation tables (e.g., hypervisor page tables) of a hypervisor can point to the same page across multiple VMs. Pointing various addresses to the same page can be referred to as page sharing. Page sharing can reduce the total number of pages needed to operate one or more VMs. Reducing the total number of pages needed to operate one or more VMs can free up capacity for more VMs or free up capacity to perform additional operations.

The mechanism adopted by the hypervisors during write operations to a common page comprising common data is called Copy on Write (CoW) in which the entire page's data is first copied and then the specific data sector is written into and the translation tables (e.g., page tables) are updated. The hypervisor can run on CPU cores (e.g., processing device) of the host, which utilizes the core's compute resources and caches. Page sharing at the hypervisor and COW at the hypervisor can contribute to memory resource constrains in computing systems running a hypervisor with several VMs.

Aspects of the present disclosure address the above and other deficiencies by implementing a data hashing engine (DHE) in the memory sub-system. The DHE can offload the hash operations performed by the host to the memory sub-system. The DHE can comprise hardware and/or firmware to perform hash operations on data stored in the memory sub-system. The host can provide commands to the memory sub-system to initiate performance of hash operations on data stored in the memory sub-system. The hash operations can include the generation of a signature for the data stored in the memory sub-system. The signature (e.g., hash) can be provided to the host. The host can retain control of the identification of common pages and the management of the common pages. However, the host can offload the performance of the hash operations to the memory sub-system. Offloading the hash operations to the memory sub-system allows the host to be more efficient given that the host can perform fewer operations. Offloading the hash operations to the memory sub-system allows the host to operate more efficiently given that the resources utilized to perform hash operations can be freed and utilized to perform different operations.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Figure 1:
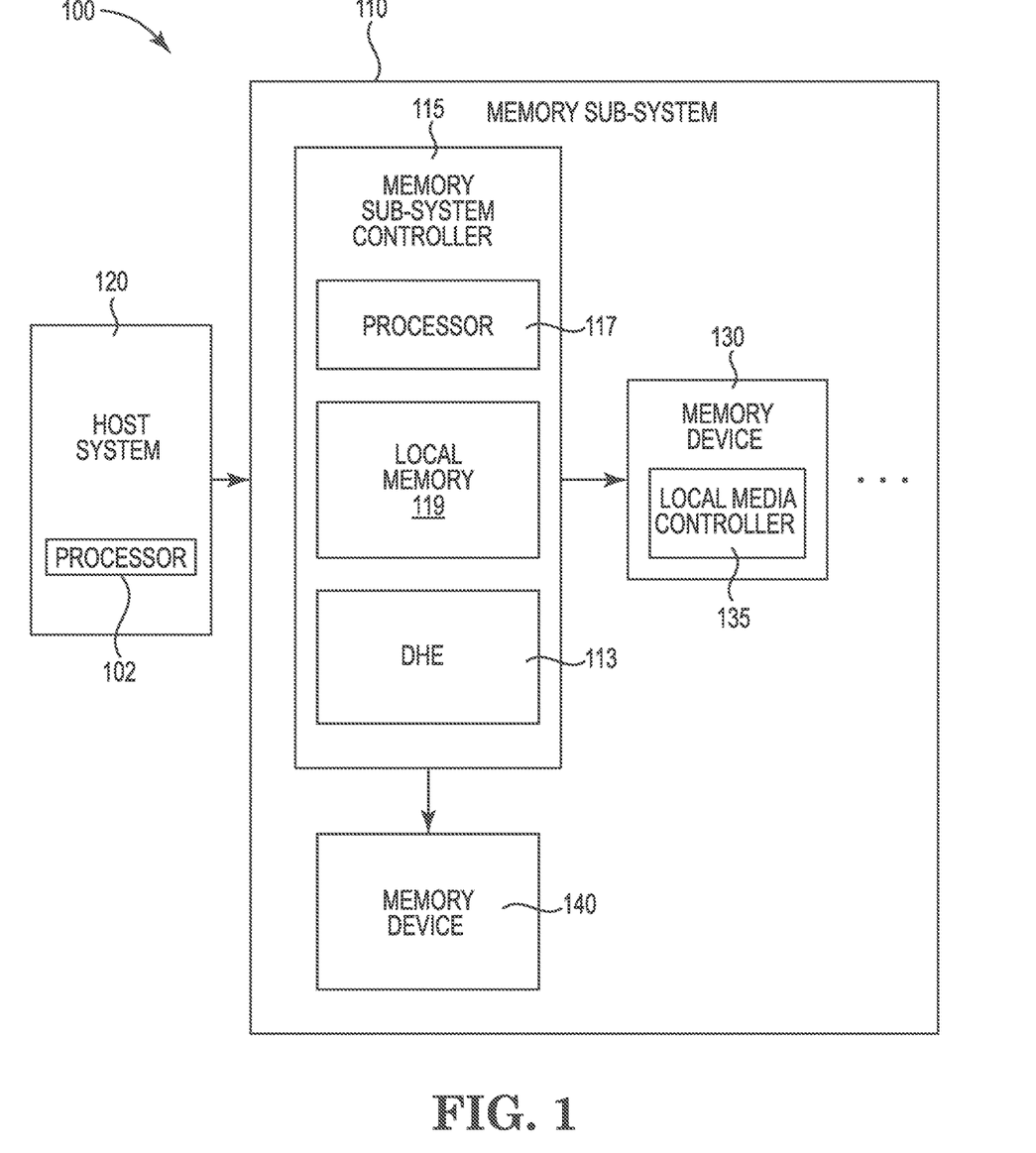
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor 102 or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as media management operations. Media management operations can include wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include interface circuitry to communicate with the host system 120.

The memory sub-system 110 can also include additional circuitry or components that are not illustrated. In some embodiments, the memory sub-system 110 can include a cache or buffers (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system controller 115 can include a DHE 113. Although not shown in FIG. 1, the DHE 113 can include various circuitry to perform hash operations on data stored in the memory devices 130, 140. In some embodiments, the DHE 113 can include special purpose circuitry in the form of an ASIC, FPGA, state machine, and/or other logic circuitry that can allow the DHE 113 to orchestrate and/or perform operations to selectively perform hash operations for the host 120.

The memory sub-system 110 can perform hash operations at the DHE 113 to offload the performance of the hash operations from the host 120 (e.g., processor 102 of the host 120). The memory sub-system 110 can share the signatures generated by the hash operations with the host 120. The DHE 113 can perform the hash operations on chunks of data of an entire page to generate the signature. A signature is a unique identifier of data (e.g., page of data) generated by performing a hash operation using the data. The signature can be referred to as a hash of the data. The DHE 113 can perform the hash operations sequentially on data in chunks. The DHE 113 retain intermediate results of the hash operations to be used with a next data chunk. The DHE 113 can be implemented as fixed state machines in hardware and/or via firmware designed specifically for the DHE 113. As used herein, a fixed state machine comprises hardware and/or firmware that can be in one of a finite number of states which do not change. The DHE 113 can perform different types of operations, which can be loaded/configured at system start and/or run dynamically via firmware. The source and destination physical/logical memory addresses can be provided from the software intent (e.g., hypervisor) through the processor 102 via the non-deterministic protocol. The hypervisor can provide the source (e.g., source address) and destination (e.g., destination address) either via special commands or write commands to certain addresses (e.g., addresses of regions of the memory sub-system 110). The resulting non-deterministic complete message comprising the signatures can be transferred to the host 120 via the same non-deterministic protocol. The DHE 113 can be configured to run the hash operations on sequential data via markers written to specific memory regions and provided to the target device when flushing data to memory.

Particular regions of memory can be marked in advance to be recognized by the DHE 113 as regions to perform hash operations. The particular region can be multiples of 4 k bits page size, for example. When pages (e.g., 4 k bit pages of 64×64 bits of sequential data) are written from a separate storage/memory device, the memory sub-system can receive the data in chunks (e.g., 64 bit chunks). The DHE 113 can recognizes the received pages by the address and can perform the hash operation sequentially over each chuck. The DHE 113 can utilize state to capture intermediate results, finally leading to a signature (e.g., 64 bit signature). The signature can be stored in a separate address region as a list of consecutive signatures (e.g., list of 64 bit signatures) for sequentially located pages (e.g., 64 k bit pages).

The DHE 113 can be implemented in conjunction with virtualized environments where there is page sharing functionality invoked and controlled by a hypervisor and/or in operating system operations trying to find similar pages. The DHE 113 can also be implemented when used with persistent media storing large data and/or programs. Integrity checks can be done on the memory sub-system 110 itself close to the data source and without having the host 120 intervening.

Figure 2:
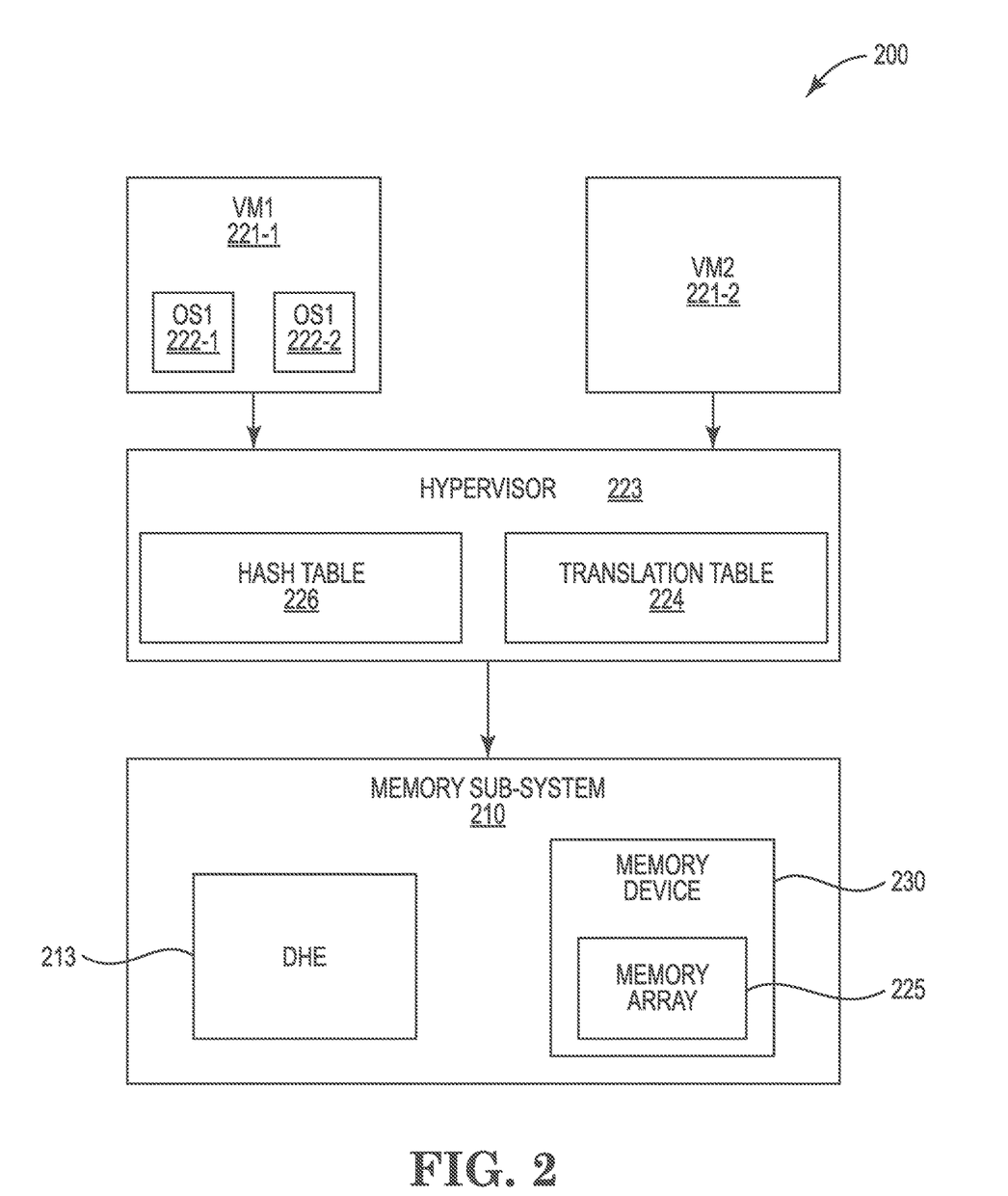
FIG. 2 illustrates an example computing system that includes a memory sub-system in accordance with some embodiments of the present disclosure.

FIG. 2 illustrates an example computing system 200 that includes a memory sub-system 210 in accordance with some embodiments of the present disclosure. The computing system 200 includes VMs 221-1, 221-2, hypervisor 223, and memory sub-system 210. The VMs 221-1, 221-1, referred to as VMs 221, further comprise operating systems (OSs) 222-1, 222-2, referred to as OSs 222. The hypervisor 223 includes a translation table 224 and a hashing table 226. The memory sub-system 210 includes the DHE 213, a memory device 230, and a memory array 225. Although the memory device 230 is labeled 230, the memory device can include volatile and/or non-volatile memory.

In various instances, the OSs 222, the VMs 221, and the hypervisor 223 can be implemented as software. The memory sub-system 210 is implemented as hardware. The OSs 222, the VMMs 221, and the hypervisor 223 can be implemented by the processor 102 of the host 102 of FIG. 1.

The OSs 222 can request access to an address from the VMs 221. The addresses provided from the OSs 222 to the VMs 221 can be system virtual addresses. As used herein, a system virtual address refers to an address of a virtual software system provided by the VMs 221. The VMs 221 can resolve the system virtual addresses to guest physical addresses. As used herein, the guest physical address refers to an address of a virtual physical system provided by the hypervisor. The VMs 221 can provide the guest physical addresses to the hypervisor 223. The hypervisor 223 can resolve the guest physical addresses to system physical addresses using the translation table 224. As used herein, the system physical address refers to an address of the memory sub-system 110.

The translation table 224 can be used to resolve guest physical addresses to system physical addresses. For example, a first guest physical address can be resolved to a first system physical address and a second guest physical address can be resolved to a second system physical address. The hypervisor 223 can provide the first system physical address and the second physical address to the memory sub-system 210 along with a request to generate signatures for data stored in memory cells having the first system physical address and the second physical address. The hypervisor 223 can provide the first system physical address to the memory sub-system 210 to determine whether the memory cells having the first system physical address and the memory cells having the second system physical address store the same data.

The memory sub-system 210 can receive a system physical address corresponding to a memory device 230. For example, the memory sub-system 210 can receive a system physical address corresponding to a memory array 225 of the memory device 230 or the local memory 119 of FIG. 1. The DHE 213 can access the system physical address to perform hash operations on data stored at memory cells of the memory array 225 having the system physical address. The result of performing the hash operations can be a signature unique to the data stored in the memory cells of the memory array 225 having the system physical address.

As used herein, hash operations are any number of operations that can be used to map data of an arbitrary size to fixed-size values. The values (e.g., fixed-size values) generated using the hash operations can be referred to as hash values, hash codes, hashes, and/or signatures (e.g., hash signatures).

The memory sub-system 210 can return the signature generated using the hash operations to the hypervisor 223. The memory sub-system 210 can return the signature to a host of the hypervisor 223. The signature can be stored in cache of the host and/or can be accessed by a processor of the host to be available to the hypervisor 223.

The hypervisor 223 can store signatures and corresponding addresses in the hashing table 226. A signature can be associated with an address and/or can correspond to the address if the data stored at memory having the address is used to generate the signature. The hypervisor 223 can store a first signature provided by the memory sub-system 210 and associated with the first system physical address and a second signature provided by the memory sub-system 210 and associated with the second system physical address in the hashing table 226. The hypervisor 223 can retrieve the first signature and the second signature from the hash table to compare the first signature to the second signature utilizing the first system physical address and the second system physical address, respectively. The first signature can be compared to the second signature to determine whether a first data stored in memory having the first system physical address is the same as a second data stored in memory having the second system physical address.

Responsive to determining that the first signature and the second signature are not equal, the hypervisor 223 can refrain from modifying the translation table 224. Responsive to determining that the first signature and the second signature are equal, the hypervisor 223 can update the translation table 224 such that the first guest physical address and the second guest physical address are associated with one of the first system physical address and the second system physical address. The hypervisor 223 can select one of the first system physical address and the second system physical address and associated the first guest physical address and the second guest physical address with the selected system physical address. The hypervisor 223 can also make the memory cells having the non-selected system physical address available to store additional data. The hypervisor 223 can, for example, provide a command to the memory sub-system 210 to cause the memory sub-system 210 to delete the data stored in the memory cells having the non-selected system physical address.

In various instances, the hypervisor 223 can cause two signatures to be generated simultaneously and can compare the signatures without storing the signatures to the hash table 226. The hypervisor 223 can provide multiple system physical addresses to the memory sub-system 210 and can cause the memory sub-system 210 to generate signatures one at a time for the multiple system physical addresses. The hypervisor 223 can store each signature in the hash table 226. Each time the hypervisor 223 receives a new signature, the hypervisor 223 can store the new signature in the hash table 226. The hypervisor 223 can also retrieve the new signature from the hash table 226 and can compare the new signature with the other signatures stored in the table 226 to determine if there is duplicate data stored in the memory sub-system 210.

In various examples, the hypervisor 223 can request that the memory sub-system 210 perform hash operations utilizing a write command. A generic write command may not provide an indication that hash operations are requested. However, a write command to a designated region of memory can provide an indication that hash operations are requested. For instance, during a discovery phase of a startup of the memory sub-system 210, the memory sub-system 210 can inform the hypervisor (e.g., host) 223 that a region of memory is designated for hash operations. The memory sub-system 210 can determine whether received write commands are to a memory address corresponding to the region of memory designated for hash operations. If a write command is to an address corresponding to the region of memory designated for hash operations, then the memory sub-system 210 can interpret the write command as a command to perform hash operations.

The write command to the address corresponding to the region of memory designated for hash operations can include metadata. The metadata to the write command can include one or more addresses such as one or more system physical addresses. As such, the write command can be associated with two or more addresses. The write command can be associated with a first address to which the write command is targeted. Traditionally, the write command would be used to write data to memory cells having the first address. The write command can also be associated with a second address provided as metadata. The second address can be used to identify memory cells that store data that is used to perform hash operations. As such, the second address can be referred to as a source address. The write command can also be associated with a third addresses or more addresses that can also be used to identify memory cells that store data that is used to perform hash operations. The write command can further be associated with a fourth address provided as metadata that can be used to identify memory cells that will store a signature generated by the DHE 213. The fourth address can be referred to as a destination address.

Figure 3:
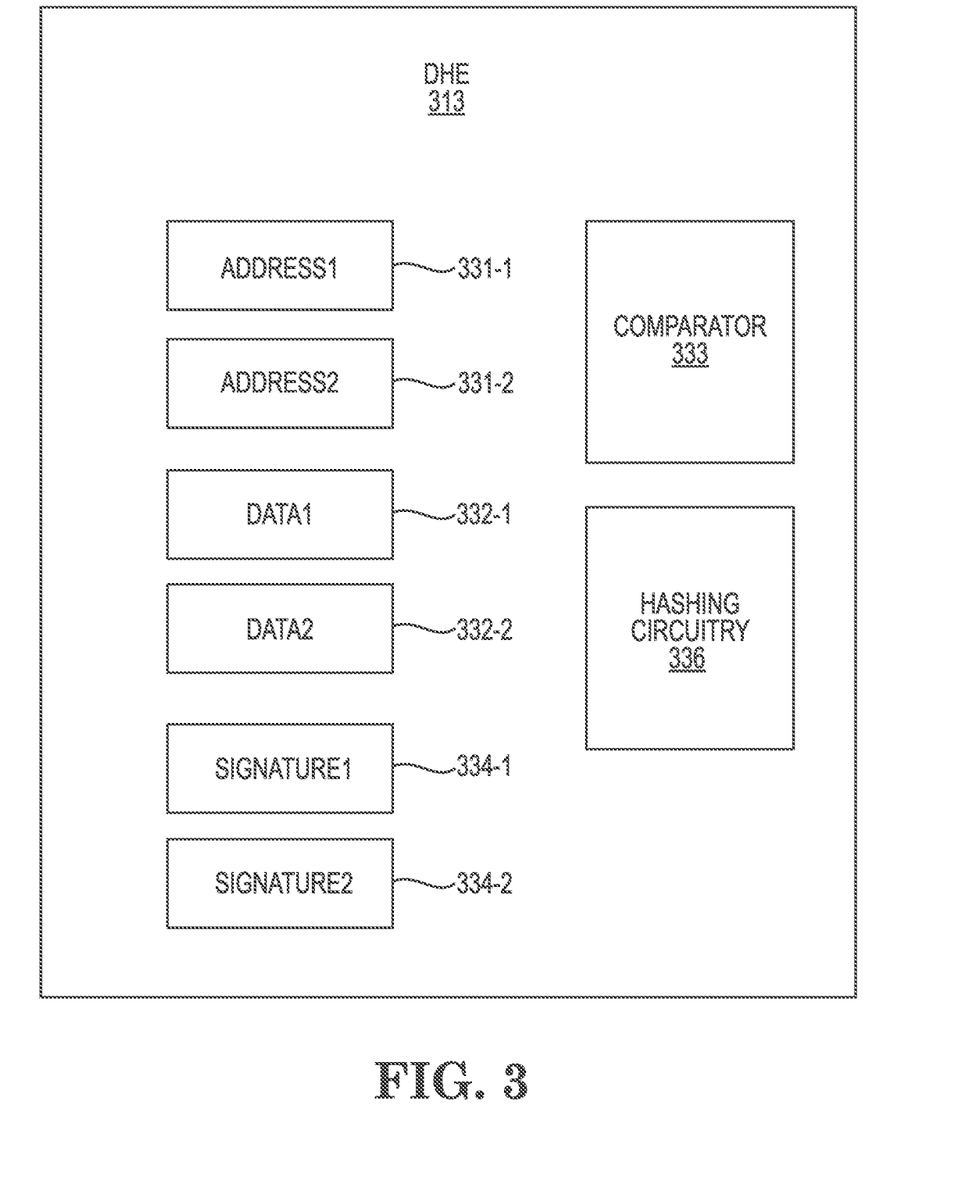
FIG. 3 is a block diagram of a data hashing engine in accordance with some embodiments of the present disclosure.

FIG. 3 is a block diagram of a DHE 313 in accordance with some embodiments of the present disclosure. The DH3 313 can be implemented in a controller of a memory sub-system or can be implemented independent of the controller of the memory sub-system. The DHE 313 is shown as including address registers 331-1, 331-2, data registers 332-1, 332-2, and signatures 334-1, 334-2. The DHE 313 is also shown as including a comparator 333 and hashing circuitry 336.

The DHE 313 can include more or less than the components shown. For example, the DHE 313 can be implemented with a single address register (e.g., the address register 331-1), a single data register (e.g., the data register 332-1), and/or a single signature register (e.g., signature 334-1) or multiple address registers, data registers, and/or signature registers.

Responsive to determining that a write command is directed to a region of memory designated for hash operations, the memory sub-system can retrieve one or more addresses from metadata and can provide the addresses to the DHE 313. The DHE 313 can store the one or more addresses in the address registers 331. The DHE 313 can cause data to be retrieved from a memory array utilizing the one or more addresses. For example, the DHE 313 can cause data to be retrieved from memory cells having an address stored in the address register 331-1. In various instances, the DHE 313 can cause data to be retrieve from memory not included in the memory array utilizing the one or more addresses. For example, the DHE 313 can cause data to be retrieved from local memory 119 in FIG. 1 utilizing an address of the local memory.

The retrieved data can be stored in the data registers 332. The data can be retrieved from the registers 332 and can be provided to the hashing circuitry 336. The hashing circuitry 336 can comprise hardware and/or firmware configured to perform hash operations on the data stored in the data registers 332. The output of the hashing circuitry 336 can be stored in the signature registers 334. The output of the hashing circuitry 336 can be referred to as a signature. The signatures can be unique for the data stored in the data registers 332. In examples where two or more addresses are provided to the DHE 313, the hashing circuitry 336 can generate multiple signatures sequentially utilizing the data stored in the data registers 332. For example, the hashing circuitry 336 can generate a first signature from the data stored in the data register 332-1 and a second signature from the data stored in the data register 332-2. The DHE 313 can cause the first signature to be stored in the signature register 334-1 and the second signature to be stored in the signature register 334-2.

Responsive to generating one or more signatures, the DHE 313 can provide the signatures to a host. The host can be given access to read the signature registers 334. The signatures stored in the registers 334 can also be provided to the host via a response. The signatures can further be stored in local memory 119 of FIG. 1, and/or in a memory array of the memory sub-system.

In examples where the DHE 313 is configured to receive a single address (e.g., source address) as metadata to a write command to a region of memory reserved for hash operations, the DHE 313 can be implemented without a comparator 333. In examples where the DHE 313 is configured to receive multiple addresses (e.g., multiple source addresses) as metadata to a write command to a region of memory reserved for hash operations, the DHE 313 can be implemented with the comparator 333. The comparator 333 can compare the signatures stored in the signature registers 334. For example, the comparator 333 can compare the first signature stored in the signature register 334-1 to the second signature stored in the signature register 334-2. The comparator 333 can compare signatures to determine whether the signatures are equal. Different signatures can be equal if the data used to generate the signatures is duplicate data.

Responsive to determining that the first signature and the second signature are equal, the DHE 313 can provide an indication, to the host, describing that the data stored in memory cells having a first address and the data stored in memory cells having a second address are duplicate data.

For example, the indication can be provided in a response to the host and/or can be stored in a memory array. The indication can also be stored in local memory 119 of FIG. 1.

In various examples, the host can control the use of the signatures and/or can initiate the generation of the signatures. In this way the host can retain control of the updating of the hash table 226 and/or the translation table 224 of FIG. 2, while offloading the hash operations to the memory sub-system. For example, the host can store the signatures in the hash table 226 and can utilize the signatures stored in the hash table 226 to update the translation table 224.

Figure 4:
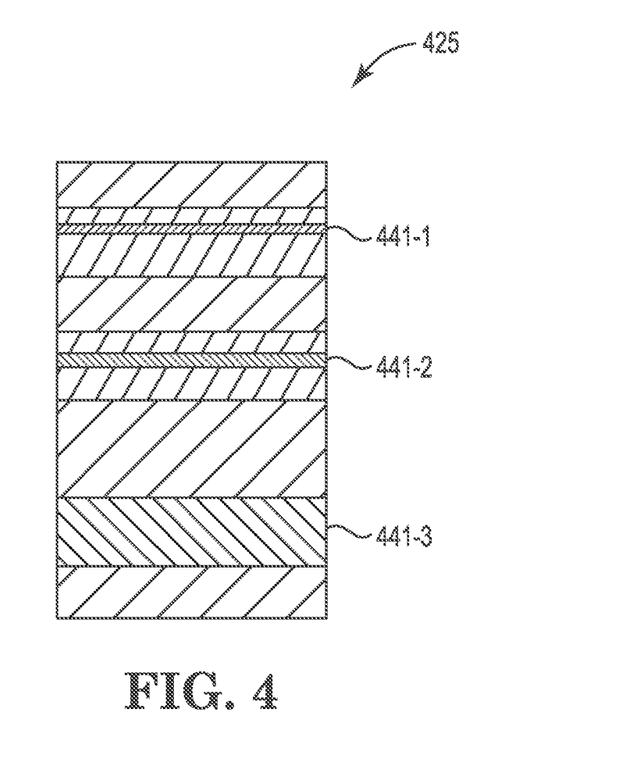
FIG. 4 is a block diagram of a memory array in accordance with some embodiments of the present disclosure.

FIG. 4 is a block diagram of a memory array 425 in accordance with some embodiments of the present disclosure. The memory array 425 includes a region of memory reserved for hash operations. The region of memory can have an address 441-3. The memory array 425 can also include a plurality of memory cells that have an address. For example, the memory array 425 can include a row of memory cells having a first address 441-1 and a different row of memory cells having a second address 441-2.

The memory cells coupled to a word line (e.g., row of memory cells) can store data. The memory cells coupled to a different word line (e.g., different row of memory cells) can store different data. A first signature can be generated by performing a first hash operation on the data. A second signature can be generated by performing a second hash operation on the different data. The first signature and the second signature can be a same signature if the data and the different data are equal. For example, the first signature and the second signature can be a same signature if the data and the different data are duplicate data.

Write command that are directed to the region of memory having the address 441-3 can be identified as requests to perform hash operations. The write commands can include metadata. The metadata can include one or more addresses of the memory array 425. For example, the metadata can include the address 441-1 and/or the address 441-2, among other possible addresses.

The DHE can retrieve the data stored in the memory cells having the address 441-1 and/or the different data stored in the memory cells having the address 441-2. The DHE can generate signatures for the data and/or the different data utilizing the hashing circuitry.

Figure 5:
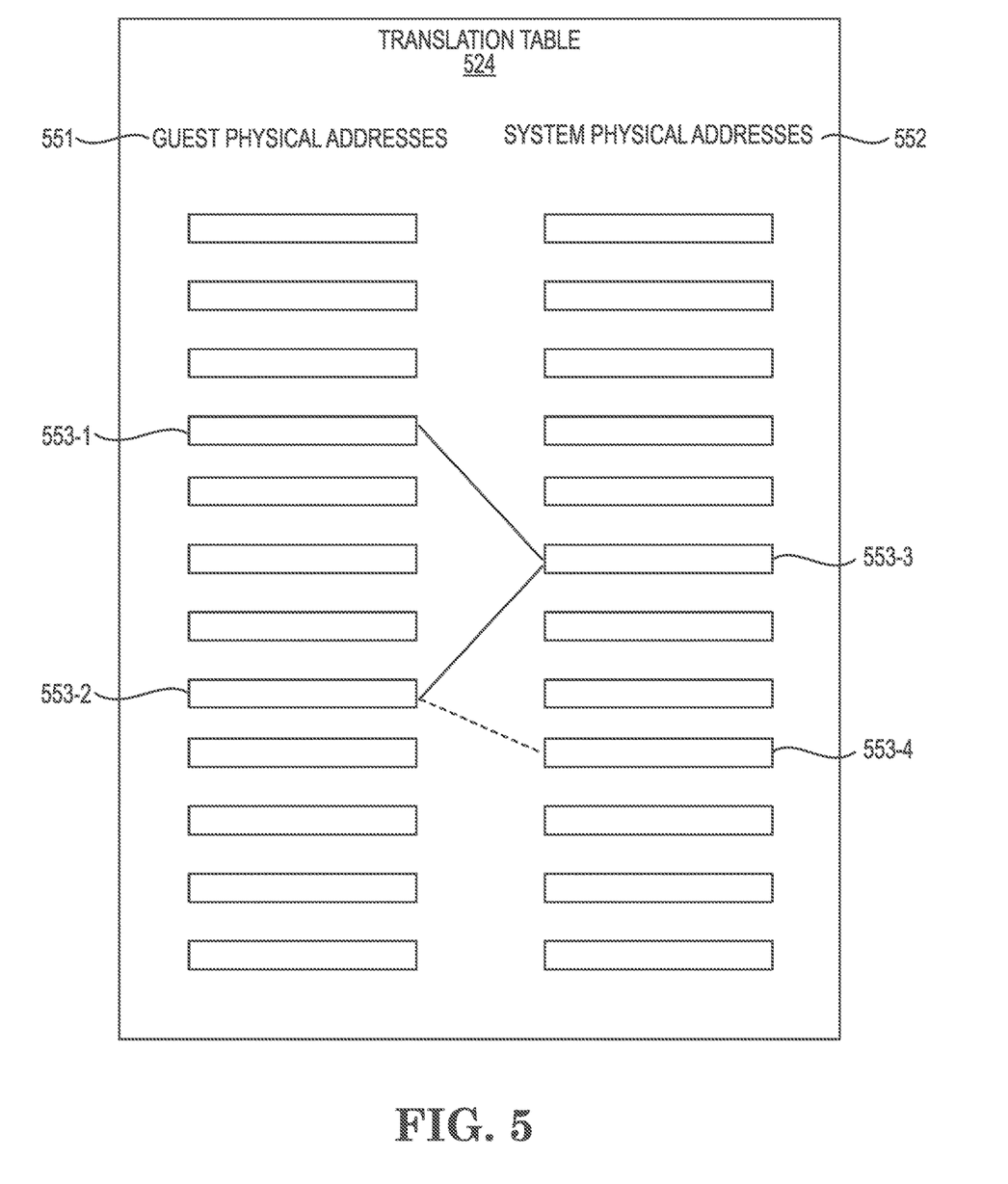
FIG. 5 is a block diagram of a translation table in accordance with some embodiments of the present disclosure.

FIG. 5 is a block diagram of a translation table 524 in accordance with some embodiments of the present disclosure. The translation table 524 can include guest physical addresses 551 and system physical addresses 552. The translation table 524 can be utilized to generate the system physical addresses 552 from the guest physical addresses 551.

The translation table 524 can include the addresses 553-1, 553-2, 553-3, 553-4. The addresses 553-1, 553-2 can be guest physical addresses 551. The addresses 553-3, 553-4 can be system physical addresses 552. The translation table 524 can associate the guest physical addresses 551 to the system physical addresses 552. For example, the translation table 524 can associate the addresses 553-1, 553-2 to the addresses 553-3, 553-4. In particular, the translation table 524 can associate the address 553-1 to the address 553-3 as indicated by the solid line connecting the address 553-1 to the address 553-3. The translation table 524 can also associate the address 553-2 to the address 553-4, prior to generating signatures for data stored at memory cells having the addresses 553-3, 553-4, as indicated by the dotted line connecting the address 553-2 to the address 553-4.

Responsive to determining that a first signature generated for data stored in memory cells having the address 553-3 and a second signature generated for different data stored in memory cells having the address 553-4 are a same signature, the hypervisor can update the translation table 524 such that both the addresses 553-1, 553-2 are associated with one of the addresses 553-3 and 553-4. For example, the hypervisor can update the translation table 524 such that both the addresses 553-1, 553-2 are associated with the address 553-3 as indicated by the solid line connecting the addresses 553-1, 553-2 to the address 553-3.

In various instances, the hypervisor can cause the different data to be deleted from the memory cells having the address 553-4. Deleting the memory cells having the address 553-4 can make the memory cells available to store additional data.

The addresses 553-1, 553-2 can be different addresses. In various instances, the addresses 553-1, 553-2 can be utilized by different VMs and/or OS in the VMs. For instance, a first VM can utilize the address 553-1 while a second VM utilizes the address 553-2. The memory cells having the addresses 553-3, 553-4 can store duplicate data. In various examples, the duplicate data can be read-only data such as a library utilized by both of the first VM and the second VM. Utilizing memory cells having the address 553-3 and not the memory cells having the address 553-4 to store the duplicated data can make the memory cells having the addresses 553-4 available to store other data.

Figure 6:
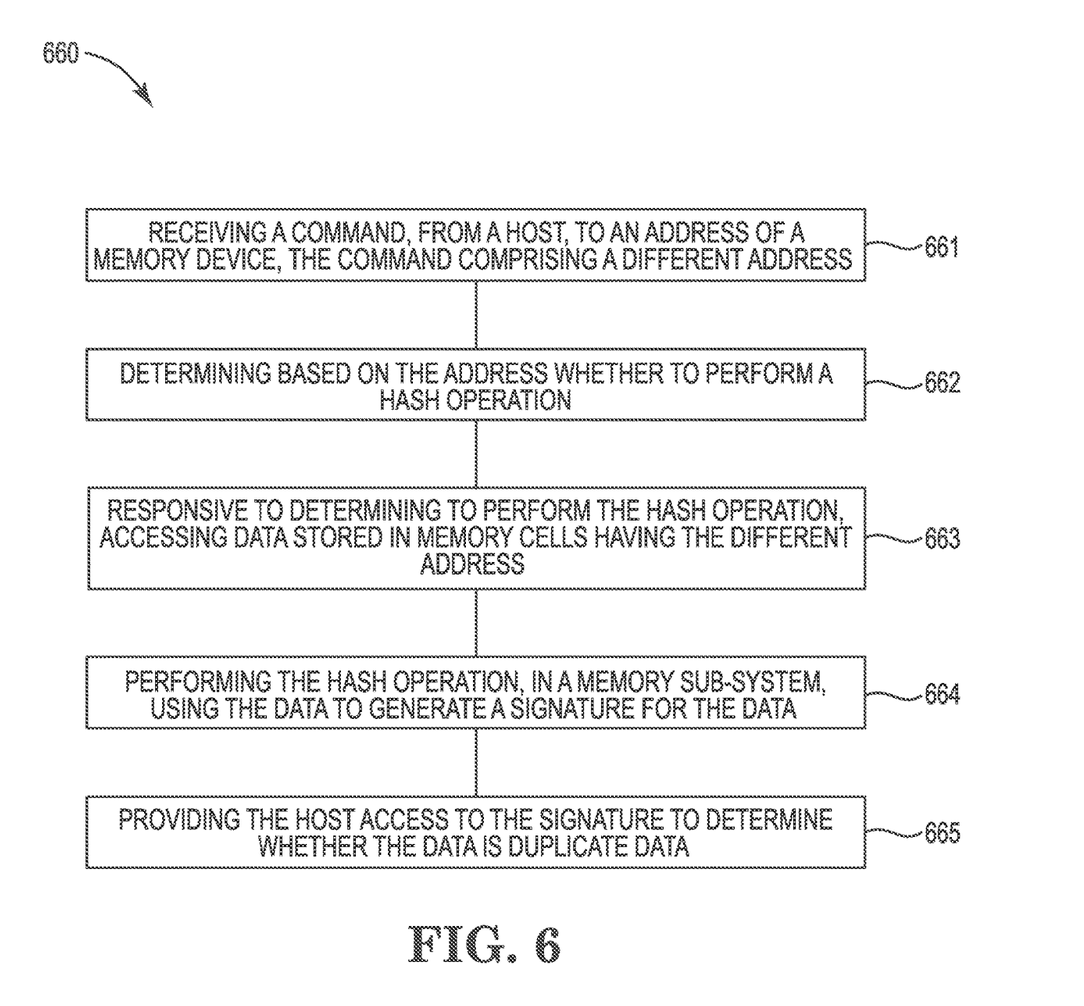
FIG. 6 is a flow diagram corresponding to a method for performing hash operation in memory for data sharing in accordance with some embodiments of the present disclosure.

FIG. 6 is flow diagram corresponding to a method 660 for controlling requests provided to a memory sub-system in accordance with some embodiments of the present disclosure. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 660 is performed by the front-end 121 of the memory sub-system 110 FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 661, a command to an address of a memory device can be received from a host. The command can comprise a different address. The different address can be included in metadata of the command. The command can be a write command. However, the command is not limited to a write command but can include different types of command such a read command, among other types of commands.

At operation 662, a determination can be made as to whether to perform a hash operation based on the address. If the address identifies a region designated for performing hash operations, a determination can be made to perform a hash operation based on receipt of the command. If the address does not identify the region, then a determination can be made not to perform a hash operation. Instead, the command can be executed as regularly. For example, if the command is a write command to an address that does not identify the region, then the write command can be performed. If the command is a read command to an address that does not identify the region, then the read command can be performed.

At operation 663, responsive to determining to perform the hash operation, data stored in memory cells having the different address can be accessed. A DHE of a controller of the memory sub-system can cause the data to be accessed from the memory cells. In various instances, the data can be accessed from registers of the memory sub-system instead of being acessed from a memory array.

At operation 664, the hash operation can be performed using the data to generate a signature for the data. The signature can be a hash signature. The signature can be unique to data. Any changes to the data can cause a change to the signature.

At operation 665, access to the signature can be provided to the host to determine whether the data is duplicate data. The host can compare the signature to different signatures of different data to determine whether the signature is equal to any of the different signatures. The host can store the signature and/or the different signatures in a hash table 226. Changes to the data can necessitate changes to the signature stored in the hash table 226. Accordingly, the host can retain control of the hash table 226. The host can verify whether any commands (e.g., write commands, for example) are provided to any of the addresses stored in the hash table 226. For example, if a write command to one of the addresses stored in the hash table 226 is provided to the memory sub-system, then the host can cause a signature to be generated for the data written to the memory cells having the address. In various instances, the host can determine whether to provide requests to perform hash operation on data stored in the memory sub-system based on whether the host identifies data stored in the memory sub-system as potential duplicate data. For instance, the host can perform pattern recognition to determine that different addresses are accessed at relatively the same time consistently to determine that said data is likely duplicate data. Such can be the case if VMs access the duplicate data at startup and the VM are initiated at relatively the same time.

In various examples, the host can be provided access to the signature by storing the signature in a destination address provided as metadata to the command. As previously described, the write command provided from the host to the memory sub-system can include metadata. The metadata can include a source address and a destination address. The source address is an address of memory cells that store the data used to generate the signature. The destination address is an address of memory cells that store the signature. Providing the destination address to the host allows the host to provide a separate read command to the destination address to read the signature. It also provides the host the ability to obtain the signature at a convenient time. For example, the host may not need the signature until a later time. Obtaining the destination address allows the host the ability to decide when to obtain the signature and continue with updating the translation table. Although various examples are described as the host performing actions and/or the hypervisor performing actions, references to the host can be interchangeable with references to the hypervisor given that the hypervisor is implemented by a host. Likewise references to a processor of the host can also be interchangeable with references to the hypervisor given that the hypervisor can be implemented by the processor of the host.

The address of the command can correspond to a region of the memory device that can be reserved as an indication to perform the hash operation. Commands directed to the address of the region of the memory device can be interpreted as commands to perform hash operations. The region of the memory device can serve as an indication because references to the region can be interpreted as a request to perform the hash operations. The host can be aware that that the address corresponds to a region of the memory device reserved for performing hash operations. The memory sub-system can provide the address to the host at startup of the memory device. For example, the memory sub-system can provide the address to the host during a discovery process (e.g., discovery) at startup of the memory device. As used herein, a discovery process of startup of a memory sub-system can describe the interactions between a host and a memory sub-system in which the memory sub-system provides the host with information that the host can utilize to interact with the memory sub-system. For example, during discovery the memory sub-system can provide the host with the address of the region of the memory sub-system reserved for performing hash operations. The host can then utilize the address to generate commands for performing hash operations.

In various examples, a processing device of a host can access a first system physical address of memory cells, of a memory device, that store data. The first system physical address can be provided by a hypervisor. The first system physical address can be associated with a first guest address. The association between the first system physical address and the first guest address can describe that the first guest physical address can be resolved to the first system physical address using a translation table, for example.

The processing device can provide the first system physical address to a memory sub-system to perform a hash operation on the data. The first system physical address can be provided as metadata to a command such as a write command. The processing device can access a signature of the data generated using the hash operation. The memory sub-system can provide the signature directly to the processing device and/or the memory sub-system can store the signature in the memory sub-system such that the processing device retrieves the signature utilizing a read command.

The processing device can compare the signature to other signatures to determine whether the data and different data are duplicate data. The different data can be stored in different memory cells having a second system physical address associated with a second guest physical address. Duplicate data can have a same signature. If the data and the different data are duplicate data, then a signature of the data and a different signature of the different data can be a same signature. Signatures can be a same signature if the signatures are qual to each other. Responsive to determining that the data and the different data are duplicate data, the processing device can update a translation table by associating the first guest physical address and the second guest physical address with the first system physical address. The processing device can also update a translation table by associating the first guest physical address and the second guest physical address with the second system physical address. The translation table is used by a hypervisor implemented by a host comprising the processing device.

The processing device can further provide a command to the memory device to delete the different data responsive to determining that the data and the different data are duplicate data. Deleting the different data from the memory cells storing the different data allows the memory cells to be utilized to store additional data.

The processing device can execute the hypervisor. The hypervisor is configured to receive the first guest physical address and the second guest physical address. The first guest physical address and the second guest physical address can be received from one or more VMs. The hypervisor can generate the first system physical address from the first guest physical address and the second system physical address from the second guest physical address utilizing the translation table. The first guest physical address can be received from a first VM while the second guest physical address is received from a second VM. In various examples, the first guest physical address and the second guest physical address are received from a same virtual machine. For example, a first OS of a VM can provide a first address that the VM translates to the first guest physical address and a second OS of the VM can provide a second address that the VM translates to the second physical address. As such, the first guest physical address can correspond to the first OS hosted by the same virtual machine and the second guest physical address can correspond to the second OS hosted by the same virtual machine.

In various examples, a memory sub-system can receive a command, from a host, to a first address of the memory device. The command can comprise multiple memory addresses as metadata. For instance, the command can comprise a second address and a third address as metadata. The memory sub-system can determine based on the first address whether to perform a hash operation. If memory sub-system can determine whether the first address corresponds to region reserved for performing hash operations. Responsive to determining, using the first address, to perform the hash operation the memory sub-system can access data stored in memory cells, of the memory device, having the second address. The memory sub-system can also access different data stored in different memory cells, of the memory device, having the third address. The memory sub-system can perform the hash operation using the data to generate a first signature for the data and the different data to generate a second signature. The memory sub-system can compare the first signature to the second signature. Responsive to comparing the first signature to the second signature, the memory sub-system can provide an indication of whether the data and the different data are duplicate data.

The memory sub-system can receive the first address of memory cells of the memory device via an address bus coupling the host to the memory sub-system. The address bus can transmit address data (e.g., addresses). The second and third addresses can be received via a command bus coupling the host to the memory sub-system. The command bus can transmit command data (e.g., commands) including metadata comprising the second and third addresses.

In various examples, the first address can correspond to local memory that is not part of the memory cells of the memory device. The first address can be to a register of the memory device. The first address can also correspond to registers of the memory sub-system. The memory sub-system can be configured to delete the one of the data and the different data responsive to receipt of a different command.

Figure 7:
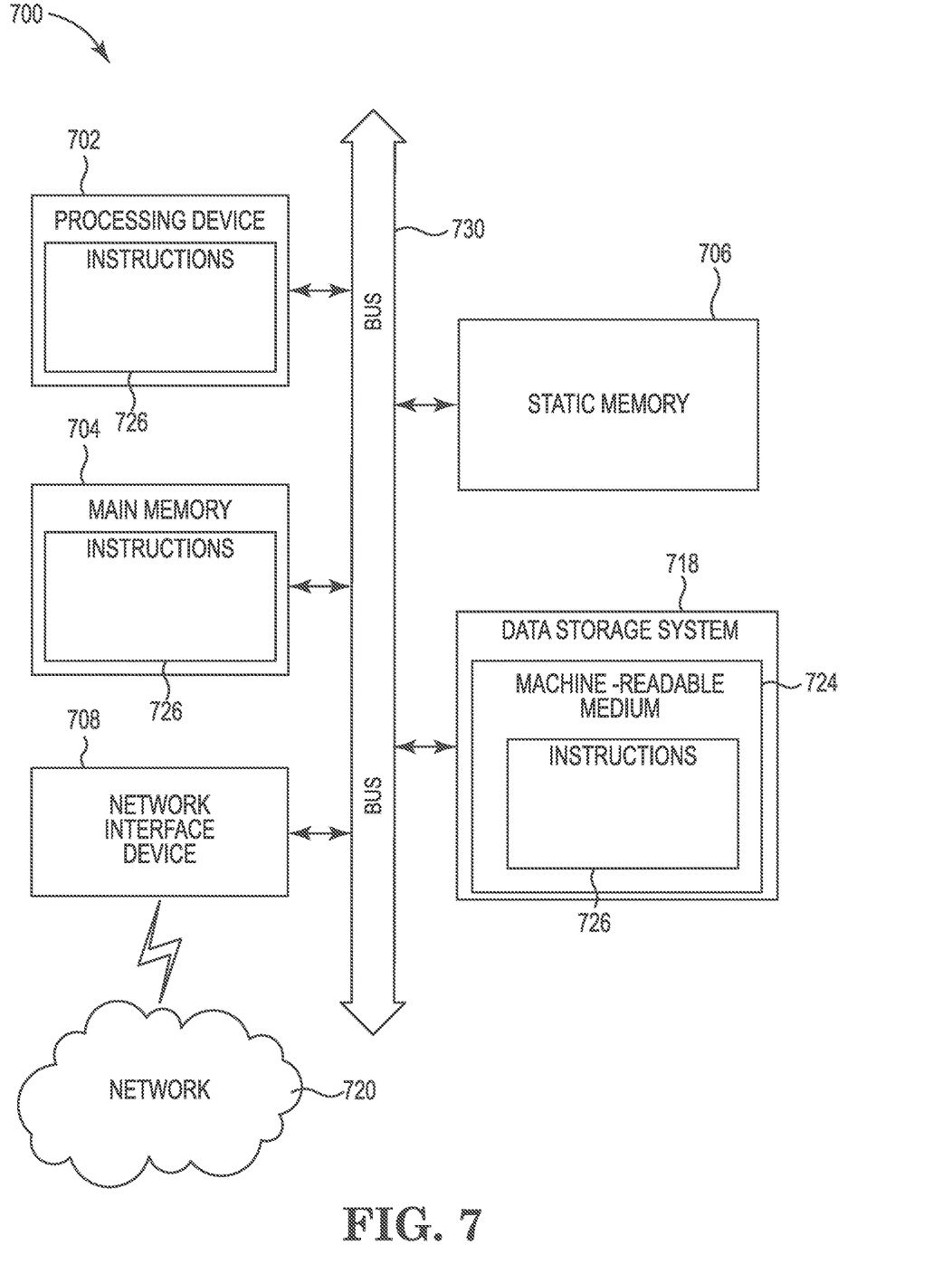
FIG. 7 is a block diagram of an example computer system in which embodiments of the present disclosure may operate.

FIG. 7 is a block diagram of an example computer system 700 in which embodiments of the present disclosure may operate. For example, FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a front-end of the memory sub-system (e.g., front-end 121 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a front-end of the memory sub-system (e.g., the front-end 121 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving a command, from a host, to an address of a memory device, the command comprising a different address;
determining based on the address whether to perform a hash operation;
responsive to determining to perform the hash operation, accessing data stored in memory cells having the different address;
performing the hash operation, in a memory sub-system, using the data to generate a signature for the data; and
providing the host access to the signature to determine whether the data is duplicate data.

2. The method of claim 1, wherein the signature is unique for the data.

3. The method of claim 1, further comprising providing the host access to the signature by storing the signature in a destination address provided as metadata to the command.

4. The method of claim 1, wherein the address corresponds to a region of the memory device reserved as an indication to perform the hash operation.

5. The method of claim 1, further comprising providing the address to the host at startup of the memory device.

6. The method of claim 1, further comprising providing the address to the host during discovery at startup of the memory device.

7. The method of claim 1, wherein the command comprises the different address as metadata.

8. The method of claim 1, further comprising performing the hash operation sequentially on chunks of the data to generate the signature for the data.

9. The method of claim 8, further comprising:
retaining intermediate results of the hash operation performed on the chunks of the data; and
utilize the intermediate results to perform the hash operation on a next chunk of the chunks of the data.

10. An apparatus, comprising:
a processing device, configured to:
access a first system physical address of memory cells, of a memory device, that store data, wherein the first system physical address is provided by a hypervisor and wherein the first system physical address is associated with a first guest physical address;
provide the first system physical address to a memory sub-system to perform a hash operation on the data;
access a signature of the data generated using the hash operation;
compare the signature to other signatures to determine whether the data and different data are duplicate data, wherein the different data is stored in different memory cells having a second system physical address associated with a second guest physical address;
responsive to determining that the data and the different data are duplicate data, update a translation table by associating the first guest physical address and the second guest physical address with the system physical address.

11. The apparatus of claim 10, wherein the processing device is further configured to, responsive to determining that the data and the different data are duplicate data, provide a command to the memory device to delete the different data.

12. The apparatus of claim 10, wherein the translation table is used by the hypervisor implemented by a host comprising the processing device.

13. The apparatus of claim 12, wherein the processing device is configured to execute the hypervisor and wherein the hypervisor is configured to:
receive the first guest physical address and the second guest physical address;
generate the first system physical address from the first guest physical address and the second system physical address from the second guest physical address utilizing the translation table.

14. The apparatus of claim 13, wherein the first guest physical address is received from a first virtual machine and the second guest physical address is received from a second virtual machine.

15. The apparatus of claim 13, wherein the first guest physical address and the second guest physical address are received from a same virtual machine.

16. The apparatus of claim 15, wherein the first guest physical address corresponds to a first operating system hosted by the same virtual machine and the second guest physical address corresponds to a second operating system hosted by the same virtual machine.

17. An apparatus, comprising:
a memory array;
a processing device coupled to the memory array and configured to:
receive a command, from a host, to a first address of a memory device, the command comprising a second address and a third address as metadata;
determine based on the first address whether to perform an operation;
responsive to determining, using the first address, to perform the operation:
access data stored in memory cells, of the memory device, having the second address;
access different data stored in different memory cells, of the memory device, having the third address;
perform the operation using the data to generate a first signature for the data and the different data to generate a second signature;
responsive to comparing the first signature to the second signature, provide an indication of whether the data and the different data are duplicate data.

18. The apparatus of claim 17, wherein the processing device is further configured to receive the first address of memory cells of the memory device via an address bus coupling the host to the processing device.

19. The apparatus of claim 17, wherein the processing device is further configured to receive the first address of the memory device, wherein the first address does not correspond to memory cells of the memory device.

20. The apparatus of claim 19, wherein the first address is to a register of the memory device.

21. The apparatus of claim 17, wherein the commands to the first address identify the operation.

22. The apparatus of claim 17, wherein the processing apparatus is further configured to, responsive to receipt of a different command, delete one of the data and the different data.

23. The apparatus of claim 17, wherein processing apparatus is configured to perform the operation using a fixed state machine.

24. The apparatus of claim 17, configured to update a firmware of the processing device to perform a hash operation using the data to generate the first signature for the data and the different data to generate the second signature.

25. The apparatus of claim 17, configured to update a firmware of the processing device to perform a different operation using the data to generate the first signature for the data and the different data to generate the second signature.

* * * * *